United States Patent
Biniguer (10) Patent No.: US 10,552,366 B2
(45) Date of Patent: Feb. 4, 2020

(54) METHOD OF COMMUNICATION FOR MASTER DEVICE AND SLAVE DEVICE ON SYNCHRONOUS DATA BUS WHEREIN MASTER AND SLAVE DEVICES ARE COUPLED IN PARALLEL

(71) Applicant: STMicroelectronics (Grand Ouest) SAS, Delarue (FR)

(72) Inventor: Thierry Biniguer, Le Mans (FR)

(73) Assignee: STMICROELECTRONICS (GRAND OUEST) SAS, Delarue (FR)

( * ) Notice: Subject to any disclaimer, the term of this patent is extended or adjusted under 35 U.S.C. 154(b) by 0 days.

(21) Appl. No.: 16/027,062

(22) Filed: Jul. 3, 2018

(65) Prior Publication Data
US 2019/0012291 A1 Jan. 10, 2019

(30) Foreign Application Priority Data
Jul. 4, 2017 (FR) ...................................... 17 56292

(51) Int. Cl.
*G06F 13/00* (2006.01)
*G06F 13/42* (2006.01)

(52) U.S. Cl.
CPC .. *G06F 13/4295* (2013.01); *G06F 2213/0002* (2013.01)

(58) Field of Classification Search
CPC .................................................. G06F 13/4295
See application file for complete search history.

(56) References Cited

U.S. PATENT DOCUMENTS

| | | | |
|---|---|---|---|
| 5,963,464 A | 10/1999 | Dell et al. | |
| 7,378,873 B1* | 5/2008 | Tang | H03K 19/17744 326/38 |
| 8,341,324 B2 | 12/2012 | Kuo et al. | |
| 8,364,873 B2* | 1/2013 | Chen | G06F 13/387 710/10 |
| 8,384,427 B1 | 2/2013 | Tang et al. | |
| 8,441,947 B2* | 5/2013 | Pratt, Jr. | H04W 24/00 370/252 |
| 2010/0185784 A1* | 7/2010 | De Nie | G05B 19/0423 710/9 |
| 2011/0040912 A1* | 2/2011 | Godin | G06F 13/4013 710/110 |
| 2012/0072626 A1 | 3/2012 | Scott et al. | |
| 2015/0104673 A1 | 4/2015 | de Greef et al. | |

OTHER PUBLICATIONS

Kickstarter, Arduino, "ESLOV IoT Invention Kit", https://www.kickstarter.com/projects/iot-invention-kit/eslov-iot-invention-kit, Sep. 2016, 26 pages.
Wikipedia, "Serial Peripheral Interface Bus", https://en.wikipedia.org/w/index.php?title=Serial_Peripheral_Interface_Bus&oldid=785490763, Jun. 13, 2017, 13 pages.

* cited by examiner

*Primary Examiner* — Tammara R Peyton
(74) *Attorney, Agent, or Firm* — Slater Matsil, LLP

(57) ABSTRACT

Some embodiments include a method of communication between a master device and N slave devices on a synchronous data bus. The method includes selecting a slave device from among the N slave devices using a selection channel, where the master device and the N slave devices are coupled in series through the selection channel. The method also includes transmitting data between the master device and the selected slave device using a transmission channel, where the master device and the N slave devices are coupled in parallel through the transmission channel.

21 Claims, 7 Drawing Sheets

METHOD OF COMMUNICATION FOR MASTER DEVICE AND SLAVE DEVICE ON SYNCHRONOUS DATA BUS WHEREIN MASTER AND SLAVE DEVICES ARE COUPLED IN PARALLEL

CROSS-REFERENCE TO RELATED APPLICATIONS

This application claims priority to French Application No. 1756292, filed on Jul. 4, 2017, which application is hereby incorporated herein by reference.

TECHNICAL FIELD

The present invention relates generally to an electronic system, and method, and in particular embodiments, to a method of communication and corresponding device.

BACKGROUND

The Serial Peripheral Interface bus (SPI) is a synchronous serial communication interface specification typically used for short distance communication. On an SPI bus, the circuits communicate according to a master-slaves scheme where the master monitors the communication, traditionally in duplex mode (or "full-duplex" mode as it is usually termed, that is to say a mode of communication in which the communication takes place simultaneously in both directions).

The half-duplex mode also exists, in which a single bidirectional line allows the exchange between the master and a slave, in a manner alternating in time.

Figure 1A:
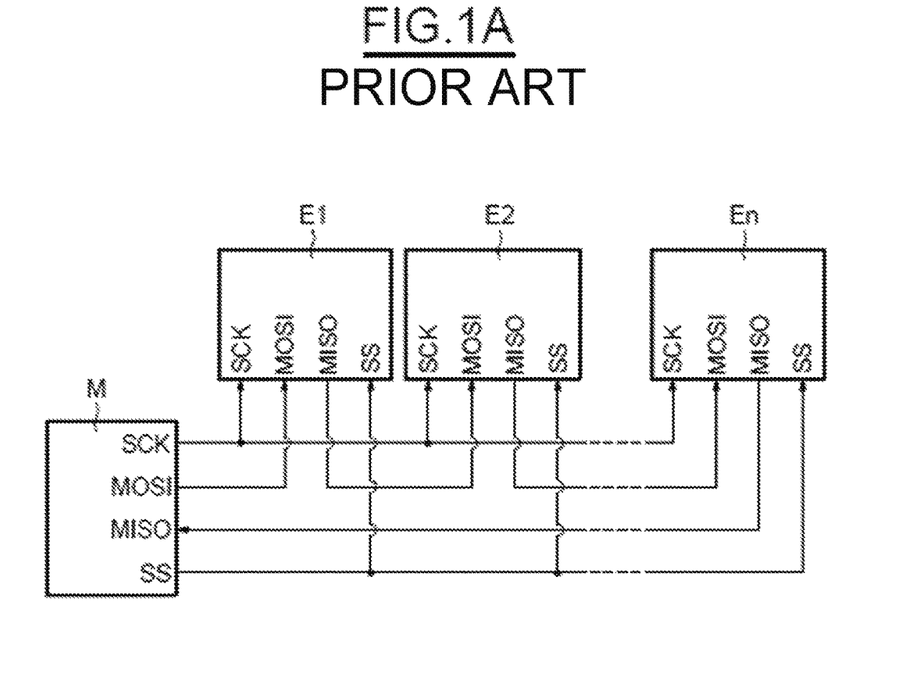
FIGS. 1A and 1B, described previously, represent conventional SPI configurations.
Figure 1B:
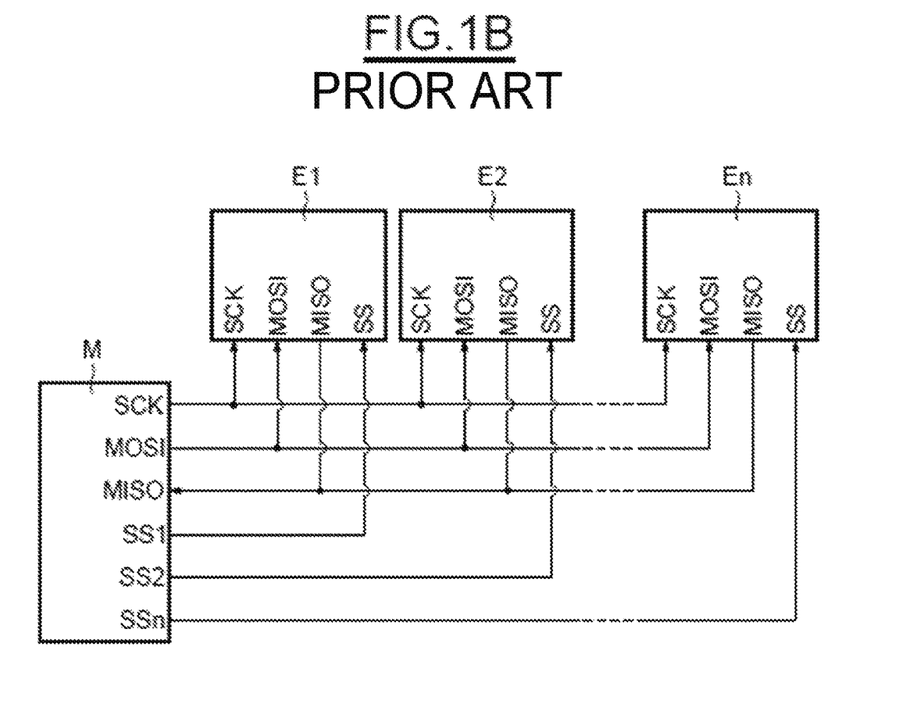

FIGS. 1A and 1B represent the two commonest types of setup of an SPI bus.

The master peripheral (or device) M generates a clock signal on a clock line SCK and selects the slave peripheral (or device) with which it wishes to communicate through the use of a slave selection signal on a slave selection line SS, and the slave responds to the requests of the master.

At each clock tick the master and the slave exchange a bit via the master-output-slave-input MOSI pathway and the master-input-slave-output MISO pathway. After eight clock ticks the master has transmitted a byte to the slave and vice-versa. The frequency of the clock signal is adjusted according to characteristics specific to the peripherals.

FIG. 1A represents a configuration of a master device M and of n slave devices E1, E2, . . . En on an SPI bus in series, in which the peripherals are all linked "in a daisy chain," one after the other.

In this series configuration, the SPI bus has 4 wires whatever the number of peripherals, but nonetheless exhibits numerous drawbacks. For example, the data received during the first clock pulses must be transmitted to other slaves during the other clock pulses so as finally to reach the last slave.

The slave devices which are not selected must therefore nevertheless be active during the communication, and an isolated failure of a slave device interrupts the entire chain.

The slave devices behave as a shift register in the chain as a whole, and execute a command contained in the last data received by order of the slave selection signal SS.

Furthermore, the frequency of the clock signal generated by the master is fixed and is limited by the speed of the slowest slave of the bus.

FIG. 1B represents a configuration of a master device M and of n slave devices E1, E2, . . . En on an SPI bus in parallel, in which the output-input MOSI and input-output MISO pathways are linked in parallel to all the slave devices E1-En.

In this parallel configuration, each slave can be selected via a slave selection line SS1, SS2, SSn which is respectively dedicated to it.

This configuration exhibits the advantage that the frequency of the clock signal can be optimized at each slave device ES1-ESn, and that the slaves that are not selected can remain inactive.

However, at least one pin of the master device M of FIG. 1B is dedicated to each slave device ES1-ESn, which may be problematic in the electrical layout. For example, the addressing of 32 slaves would require 32 pins, which may not be physically reasonable.

Moreover, whether it be in a series configuration or a parallel configuration, the setup is static and the chain cannot be enlarged dynamically during a communication.

Consequently it is desirable to improve the performance of data buses of the SPI serial peripheral interface type.

SUMMARY

Some embodiments relate to a method of communication between a master device and N slave devices connected to a synchronous data bus comprising a selection channel to which the master device and the N slave devices are connected in series, and a transmission channel to which the master device and the N slave devices are connected in parallel. In some embodiments, the method includes a selection step implemented by the master device and the N slave devices on the selection channel, comprising a selection of a slave device selected from among the N slave devices; and a transmission step implemented on the transmission channel, comprising a transmission of data between the master device and the selected slave device.

This method makes it possible to utilize the advantages of the configurations of the series type and of the parallel type without suffering the drawbacks thereof.

Advantageously, the synchronous data bus comprises a mode selection line and the selection step comprises: a first slave configuration command which is intended to place the slave devices in a serial mode and which is transmitted on the mode selection line and emanates from the master device; a communication of slave identification data between the master device and the N slave devices; and a communication of a slave selection command emanating from the master device.

According to one embodiment, the transmission step comprises a second slave configuration command which is intended to place the selected slave device in a parallel mode and which is transmitted on the mode selection line and emanates from the master device.

The communication of a slave selection command can furthermore comprise a communication of a complementary command, for example a command for activating an indication telltale or a command to rest for a given duration.

According to one mode of implementation, the master device and the N slave devices form a chain. An end-of-chain detection phase is implemented in the course of the transmission step, and before the selection step by each of the slave devices and is implemented before the selection step by the master device. The end-of-chain detection phase comprises a detection of a presence signal on the selection channel representative of an end-of-chain position or otherwise of the device.

In other words, the end-of-chain detection phase is implemented in the course of an initialization step (that is to say before the selection step) and of transmission steps, by each of the master and slave devices.

Advantageously, the end-of-chain detection phase comprises, for each device, an application of a pull voltage to a first terminal connected on a first side of the selection channel and of a resetting voltage to a second terminal connected on a second side of the selection channel, a variation of the pull voltage being representative of the presence of a slave device in the direction of the first side of the channel. In this case, the variation in pull voltage acts as presence signal.

Advantageously, the end-of-chain detection phase is implemented periodically, so as to detect hot connection or disconnection of a slave device to or from the bus.

These modes of implementation make it possible to dynamically enlarge the chain connected to the bus, and to connect as many devices as desired thereto without modifying the communication protocol. Furthermore, this method makes it possible according to advantageous modes of implementation to hot swap (add or remove) a device, that is to say when a communication is already in progress on the same bus.

According to one mode of implementation, the communication of slave identification data comprises the communication of slave characteristics comprising the maximum clock signal frequency supported by each of the N slave devices.

Thus the transmission of data can be optimized in relation to the slave characteristics corresponding to the selected slave device.

According to one mode of implementation, the communication of identification data comprises an enumeration of the number of slave devices connected to the bus.

The various commands, communications and transmissions of data can be regulated according to a synchronous data communication protocol of the SPI serial peripheral interface protocol type.

According to another aspect, there is also proposed a system comprising a master device and N slave devices connected to a synchronous data bus comprising a selection channel and a transmission channel, the master device and the N slave devices being connected in series to the selection channel and connected in parallel to the transmission channel, and configured to: exchange slave selection data on the selection channel, so as to select from among the N slave devices a selected slave device; and transmit data between the master device and the selected slave device on the transmission channel.

Advantageously, the synchronous data bus comprises a mode selection line and the master device is configured to generate on the mode selection line a first slave configuration command intended to place the slave devices in a serial mode, at the moment of exchanging slave selection data, and the slave selection data comprise a communication of slave identification data by the slave devices and a communication of a slave selection command by the master device.

Advantageously, the master device is configured to generate on the mode selection line a second slave configuration command intended to place the selected slave device in a parallel mode, at the moment of transmitting data with the selected slave device.

According to one embodiment, the N slave devices and the master device form a chain and each of the devices is configured to detect an end-of-chain position by performing a detection of a presence signal on the selection channel representative of an end-of-chain position or otherwise of the device, during the transmission of transmission data and before exchanging the selection data, and the master device is configured to detect an end-of-chain position by performing a detection of a presence signal on the selection channel representative of an end-of-chain position or otherwise of the device before exchanging selection data.

Advantageously, each device is configured, at the moment of the detection of the presence signal on the selection channel, to apply a pull voltage to a first terminal connected on a first side of the selection channel and a resetting voltage to a second terminal connected on a second side of the selection channel, a variation of the pull voltage during the measurement being representative of the presence of a slave device in the direction of the first side.

Advantageously, the master device and the N slave devices are configured to detect an end-of-chain position periodically, so as to detect hot connection or disconnection of a slave device to or from the bus.

According to one embodiment, the N slave devices are configured to communicate slave identification data comprising slave characteristics comprising the maximum clock signal frequency supported by each of the N slave devices.

Advantageously, the master device is configured to optimize the transmission of data in relation to the slave characteristics corresponding to the selected slave device.

According to one embodiment, the master device and the slave devices are configured to communicate identification data comprising an enumeration of the number of slave devices connected to the bus.

According to one embodiment, the synchronous data bus comprises a clock line and the master device is configured to generate on the clock line a clock signal intended to regulate the exchanges and transmissions of data between the devices connected to the bus.

Advantageously, the master device and the slave devices are configured to generate the various commands, communications and transmissions of data regulated according to a synchronous data communication protocol of the SPI serial peripheral interface protocol type.

According to one embodiment, the selection channel comprises a first master-output-slave-input (MOSI) line and a first master-input-slave-output (MISO) line, linking one-by-one in a chain the master device and the N slave devices, and the transmission channel comprises a second MOSI line and a second MISO line, linking in parallel the N slave devices with the master device.

Advantageously, the master device and the slave devices comprise a first bus interface of the SPI serial peripheral interface type, comprising an elementary clock line terminal, an elementary MOSI terminal and an elementary MISO terminal, as well as a second bus interface comprising a first MOSI terminal and a first MISO terminal, and a second MOST terminal and a second MISO terminal, the second bus interface furthermore comprising an output-input switch linking the elementary MOSI terminal to one or the other of the first and second MOSI terminals and an input-output switch linking the elementary MISO terminal to one or the other of the first and second MISO terminals.

Furthermore, there is proposed independently a master device and a slave device belonging or intended to belong to a system such as defined hereinabove.

These modes of implementation and embodiments allow a communication of a master device with several slave devices which is limited to six wires only and which makes it possible to dynamically change the two types of existing configurations (parallel or series) so as to obtain the best performance in the communication. Furthermore, these modes of implementation and embodiments are compatible with "hot" plugging in or unplugging of a slave device to or from the bus during a communication.

BRIEF DESCRIPTION OF THE DRAWINGS

Other advantages and characteristics of the invention will become apparent on examining the detailed description of wholly non-limiting embodiments and modes of implementation, and the appended drawings in which.

DETAILED DESCRIPTION OF ILLUSTRATIVE EMBODIMENTS

Figure 2:
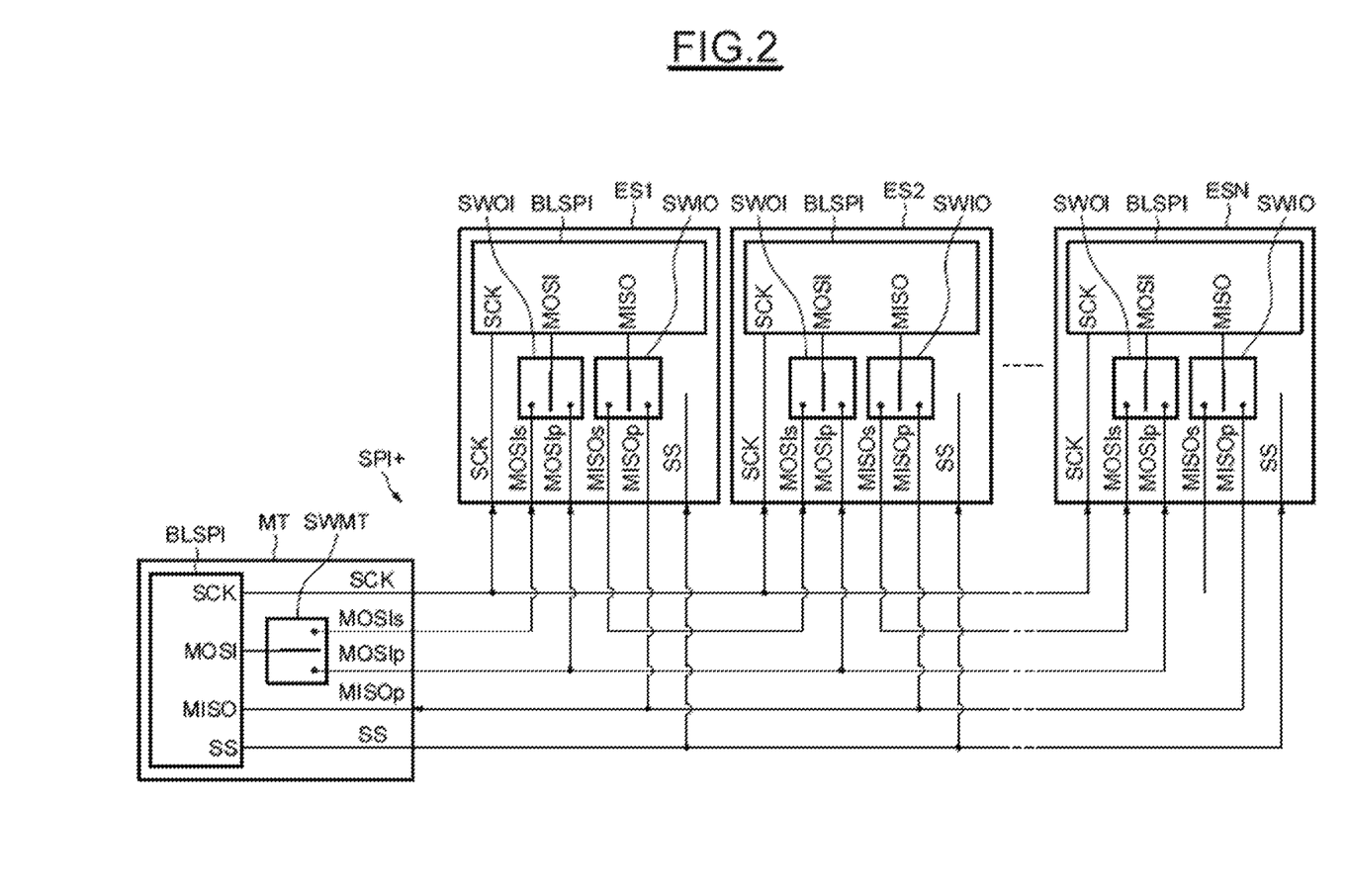
FIGS. 2 to 7 schematically illustrate various embodiments and modes of implementation of the invention.

FIG. 2 represents an exemplary setup of a master device MT and of N slave devices ES1, ES2, ESN connected consecutively one-by-one to an advantageous synchronous SPI+ data bus, according to an embodiment of the present invention.

In this embodiment, the SPI+ bus comprises in a conventional manner a clock signal line SCK arranged in parallel and intended to convey a clock signal emanating from the master device MT.

A mode selection line SS arranged in parallel is intended to convey a serial mode or parallel mode slave configuration command signal emanating from the master device MT.

The bus SPI+ comprises a selection channel, arranged in series, and a transmission channel, arranged in parallel.

The selection channel comprises a MOSI line MOSIs and a MISO line MISOs.

The transmission channel comprises a parallel MOSI line MOSIp and a parallel MISO line MISOp.

Hereinafter, for the sake of conciseness, the terms "MOSI" and "MISO" will be referred to respectively by the terms "output-input" and "input-output."

Figure 3:
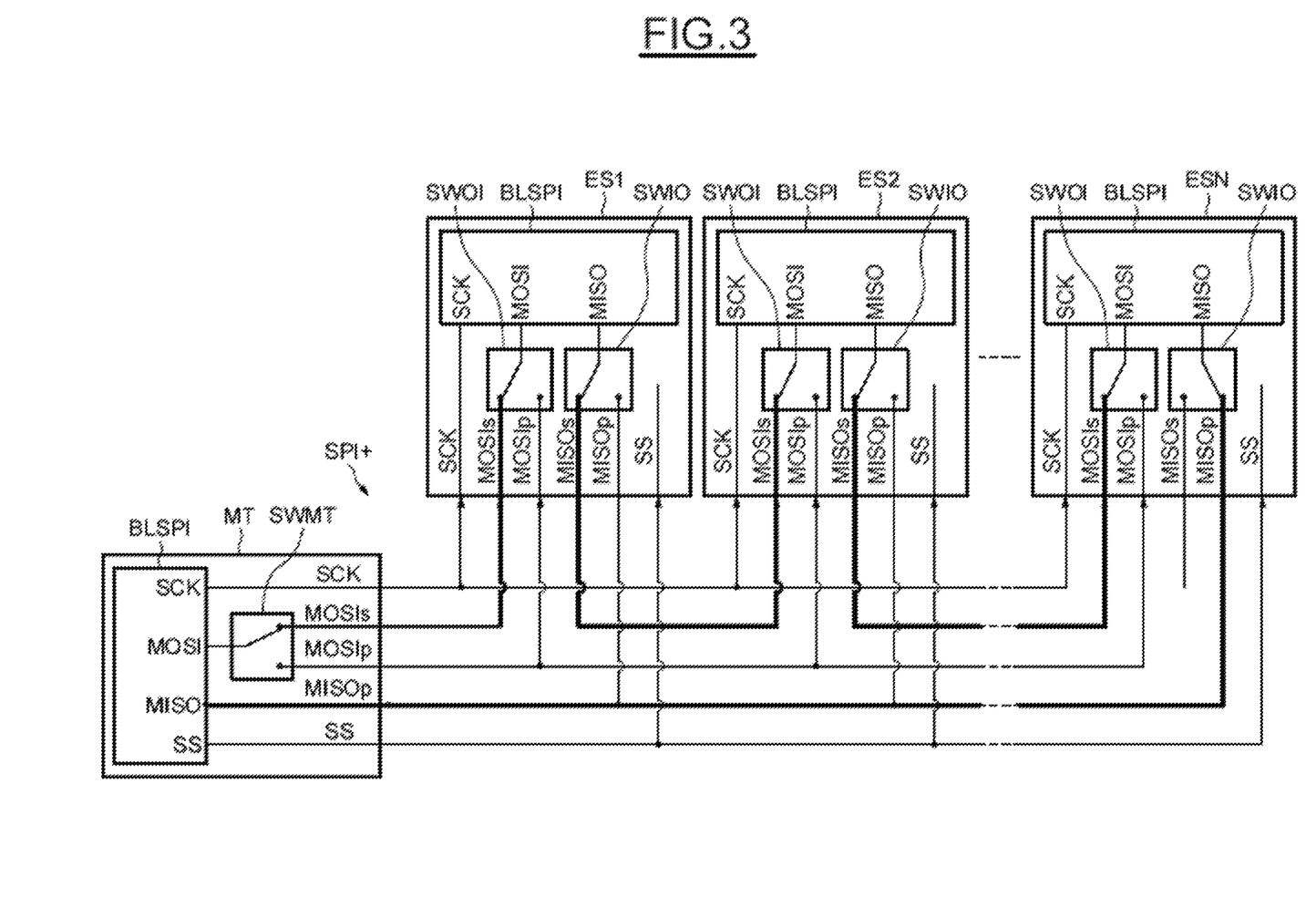

As represented by the heavy lines (in bold) of FIG. 3, in the selection channel, the serial output-input line MOSIs of the master device MT is connected to the serial output-input line MOSIs of the first slave device ES1 of the chain. The serial input-output line MISOs of the first slave device ES1 is connected to the serial output-input line MOSIs of the second slave device ES2 of the chain. The serial input-output line MISOs of the second slave device ES2 is connected to the serial output-input line MOSIs of the following slave device, and so on and so forth until the last slave device ESN.

The serial input-output line of the last slave device ESn is for its part looped back to the serial input-output line of the master device.

In this example, the serial input-output line used between the last slave device ESn and the master device MT is the same line as the parallel input-output line MISOp, it being given, as will be apparent hereinafter in particular in conjunction with FIG. 4, that this parallel input-output line MISOp is present in the transmission channel.

Figure 4:
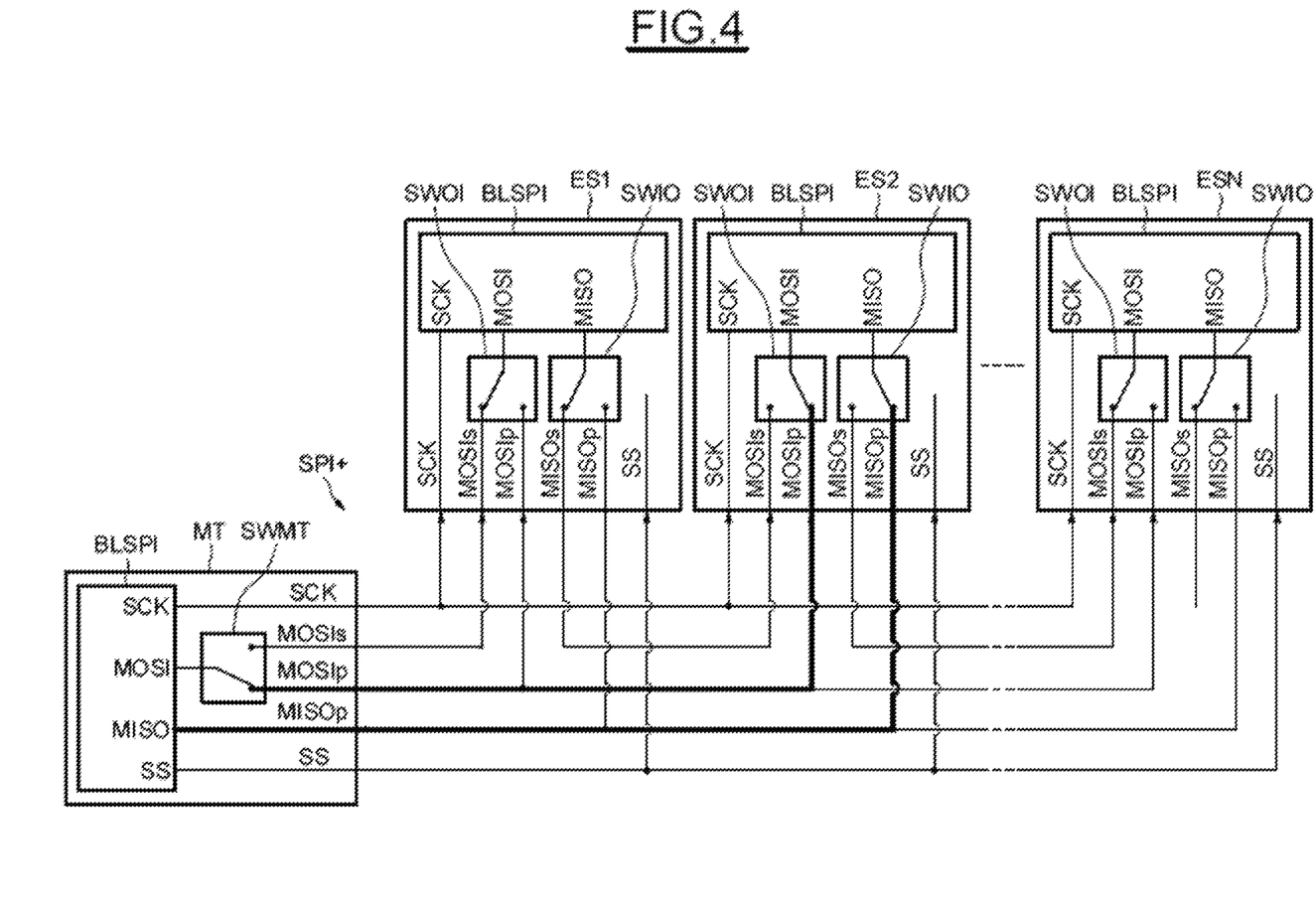

As represented by the heavy lines (in bold) of FIG. 4, in the transmission channel, the parallel output-input line MOSIp of the master device is linked to all the parallel output-input lines MOSIp of the slave devices, just as the parallel input-output line MISOp of the master device is linked to all the parallel input-output lines MISOp of the slave devices.

The selection channel is intended to convey, in particular, slave device identification communications, and slave device selection communications emanating from the master device.

The transmission channel is intended to convey in particular a transmission of data between the master device and a selected slave device, in a manner which is optimized for the capabilities of the selected slave device.

Thus, each slave device comprises an SPI+ bus interface comprising six links intended to be respectively connected to the clock signal line SCK, to the serial output-input line MOSIs, to the serial input-output line MISOs, to the parallel output-input line MOSIp, to the parallel input-output line MISOp and to the mode selection line SS.

Moreover, each master MT and slave ES1-ESN device advantageously comprises an SPI interface block BLSPI comprising the conventional SPI interface terminals: an elementary clock signal terminal SCK, an elementary output-input terminal MOSI and an elementary input-output terminal MISO.

The SPI interface block BLSPI is configured to process the data communicated on the output-input MOSI and input-output MISO terminals, regulated according to a customary SPI protocol by the cycles of the clock signal SCK.

This allows great compatibility of communications for the various devices connected to the SPI+ bus.

Consequently, the SPI+ bus interfaces of each slave device comprise on the one hand an output-input switch SWOI intended to couple the first output-input link MOSIs or the second output-input link MOSIp to the elementary output-input terminal MOSI of the block; and on the other hand an input-output switch SWIO intended to couple the first input-output link MISOs or the second input-output link MISOp to an elementary input-output terminal MISO of the block.

In other words, the output-input SWOI and input-output SWIO switches make it possible to place the respective device in a serial mode or in a parallel mode.

Likewise, the SPI+ bus interface of the master device comprises an output-input switch SWMT intended to couple the first output-input link MOSIs or the second output-input link MOSIp to the elementary output-input terminal MOSI of the block BLSPI.

These various switches may be for example embodied through the so-called "alternate IO" function, well known to the person skilled in the art and available in current microcontrollers. More precisely, the input-output (IO) pins are connected to the peripherals, here the block BLSPI, through a multiplexer. Two input-output pins can thus address the block BLSPI. These two pins, connectable to one and the same block, here the block BLSPI, are chosen from the list of input-output pins on the basis of the table available in the microcontroller datasheet and providing the combinations between all the input-output pins and all the peripheral functions.

Although not represented in FIGS. 2 to 4, the SPI+ bus interface of the master device MT can further comprise an input-output switch configured to be able to couple a first input-output link MISOs or a second input-output link MISOp to the elementary input-output terminal MISO of the block BLSPI.

That said, this input-output switch is, for a master device MT, always set to the position coupling the second input-output link MISOp to the elementary input-output terminal MISO of the block BLSPI, because of the single nature, between the serial mode and the parallel mode, of the input-output line MISOp of the master device MT.

This makes it possible to utilize an interface of the SPI+ bus which is advantageously identical for the master devices or the slave devices.

In the serial mode, the device is connected to the selection channel of the SPI+ interface. In the parallel mode, the device is connected to the transmission channel of the SPI+ interface.

The output-input SWOI and input-output SWIO switches are controlled by a control signal originating from the respective device, for example in particular as a function of the signal communicated on the mode selection line SS.

In some embodiments, the SPI+ bus allows the master device MT to communicate and to select the two possible configurations (or modes) dynamically by using the mode selection signal on the mode selection line SS.

This signal SS commands each slave in a reconfiguration procedure to act either in a serial mode (for bus monitoring purposes), or in a parallel mode (for data transmission and exchange purposes).

A single instance of SPI protocol is used, which is dynamically (re-)routed on the transmission channel or the selection channel as a function of the mode selection signal SS.

The MOSI and MISO lines of the SPI instance are hot reconfigured and become either the first lines MOSIs and MISOs of the selection channel, or the second lines MOSIp and MISOp of the transmission channel.

If a waiting period is necessary, the master device may wait at least for this period; likewise, if a notification signal is necessary, the master device MT may wait for the reception of this signal.

After an activation or a re-initialization, the SPI+ bus may automatically be configured in serial mode.

When data transmission is necessary, the SPI+ bus is switched and executed in parallel mode.

In the slave devices, a read or write state monitoring register is used and the unselected slave devices enter a presence detection procedure, while the selected slave device operates effectively in parallel mode.

Figure 5:
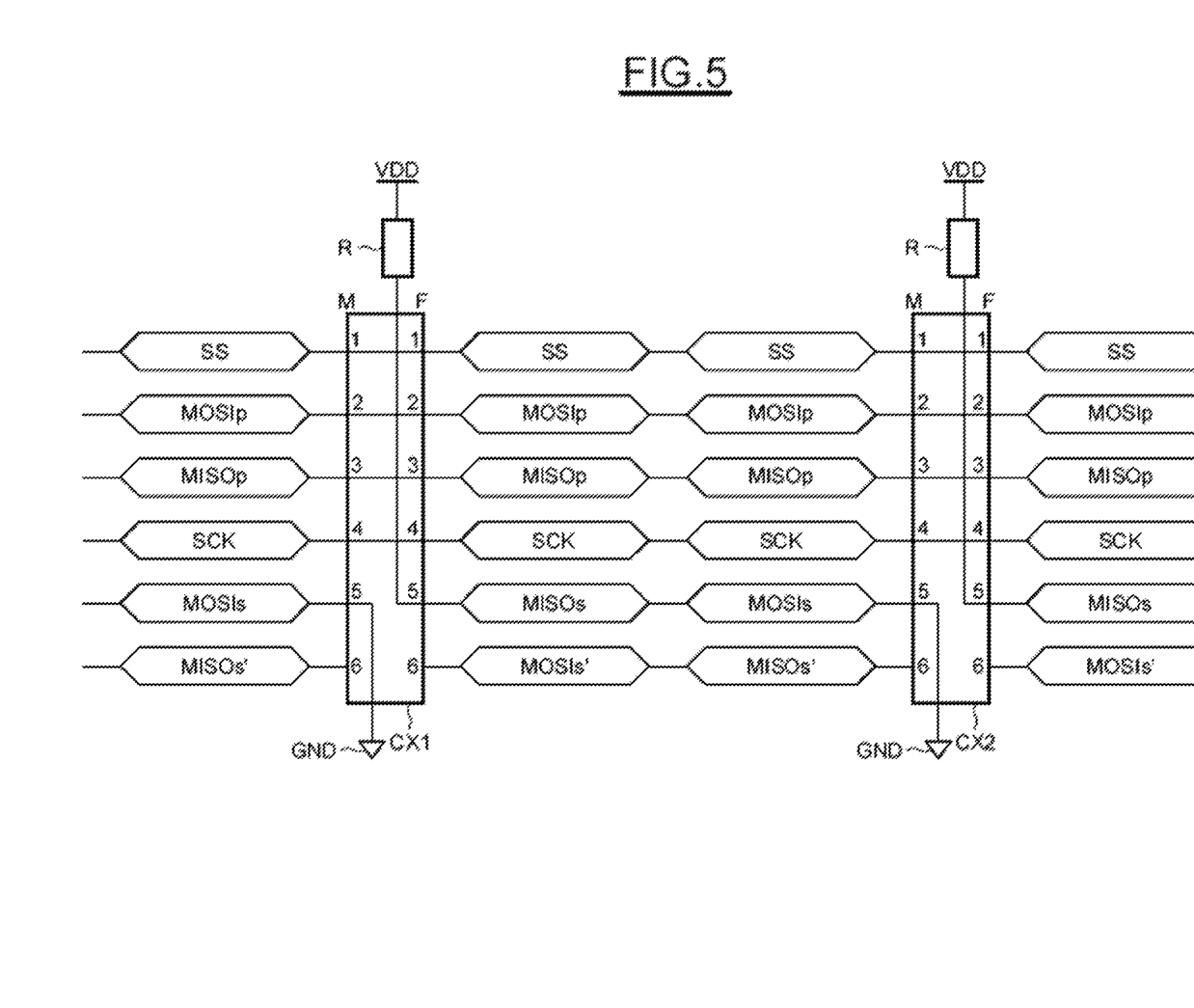

FIG. 5 represents six-pin connectors CX1, CX2 making it possible to connect devices one-by-one to an SPI+ data bus such as described previously in conjunction with FIGS. 2 to 4.

For example, the connector CX1 belongs to the SPI+ bus interface associated with the first slave device ES1 described previously in conjunction with FIGS. 2 to 4 and the other connector CX2 belongs to the SPI+ bus interface associated with the second slave device ES2 described previously in conjunction with FIGS. 2 to 4.

The connectors comprise a female side F comprising six sockets 1, 2, 3, 4, 5, 6 and a male side M comprising six pins 1, 2, 3, 4, 5, 6. A pair of a socket and of a pin connected together is referred to by the term point, followed by the same reference.

The points 1 to 4 of each connector CX form the parallel connections of the SPI+ bus, that is to say the clock signal line SCK to the point 4, the mode selection line SS to the point 1, and the transmission channel to the points 2 and 3, i.e., the output-input line MOSIp to the point 2 and the input-output line MISOp to the point 3.

The point 5 connects the serial input-output line MISOs of the slave device ES1 to the serial output-input line MOSIs of its neighbor ES2.

In this representation, the point 6 connects another serial output-input line MOSIs' of the slave device ES1 to another serial input-output line MISOs' of its neighbor ES2.

The other serial output-input MOSIs' and serial input-output MISOs' lines are "dummy" lines forming neither the selection channel nor the transmission channel, but allow symmetric plugging in (that is to say that a slave device can be added to the chain equally well by coupling the pins M of the new device in the sockets F of the last device of the chain, or conversely by coupling the sockets F of the new device on the pins M of the last device of the chain).

This architecture of connectors CX1-CX2 further exhibits the advantage of allowing one and the same connector to be compatible equally well with a master device or with a slave device, offering an advantageous modularity from the hardware standpoint; and, as detailed hereinafter, the advantage of operating a detection on the left (for example in the case where a master were to become a slave) so as to know whether the device is in a master configuration.

Moreover, FIG. 5 represents a configuration for detecting the presence of a neighbor slave device on the selection channel. In particular, this configuration allows a master or slave device to detect the presence of a slave device connected to its right; in the orientation of FIG. 5, connected on the side of the sockets F.

For the master device, this makes it possible to verify that a slave device is connected so as to instigate a communication on the SPI+ bus.

For a slave device, this makes it possible to determine whether it is the last device connected to the SPI+ bus.

If the (last) slave device (ESN) does not detect the presence of a neighbor slave device, it configures its SPI+ bus interface to loop its elementary input-output line MISO back to the master device MT on the parallel input-output line MISOp of the transmission channel.

The presence detection configuration comprises the application of a resistive pull voltage to a terminal connected on one side F of the selection channel, and of a firm resetting voltage to a terminal connected on another side M of the selection channel.

If a slave device is connected to the SPI+ bus, then the application of the firm resetting voltage will cause the pull voltage to vary, this corresponding to presence of a neighbor slave device.

In the example represented by FIG. 5, the resistive pull voltage is applied to the socket 5, that is to say the serial input-output line MISOs of the serial pathway, by coupling of a reference voltage source of high level VDD via a resistor R. The resetting voltage is applied to the pin 5, that is to say the serial output-input line MOSIs of the serial pathway, by direct coupling of a reference voltage source of low level GND.

If two devices are connected to one another, then their socket 5 and pin 5 are linked at a point 5, and the resetting voltage is firmly applied to this point, thereby causing the value of the resistive voltage of the point 5 to vary, that is to say to drop in this example.

If no device is connected, then the voltage of the socket 5 does not vary, that is to say remains at a high level in this example.

A measurement of the voltage level on the socket 5 thus enables the slave device to detect presence of a neighbor device.

Advantageously, this configuration is implemented in a periodic manner by the slave devices not being selected, during a parallel mode slave configuration command.

This configuration thus allows the detection of hot connection or disconnection of a device to or from the SPI+ bus and moreover makes it possible to know whether the slave device is the last slave device connected to the bus.

It is consequently possible to plug slave devices into the SPI+ bus and to unplug them from it without interrupting any processing, the SPI+ bus interfaces being capable of self-configuring as a function of the devices connected to the SPI+ bus.

The master device is advantageously configured to implement such a detection of presence of a neighbor slave device on the serial pathway, before beginning a communication on the SPI+ bus in serial mode.

Moreover, neighbor device detection can be implemented on the other side of the six-pin connector, that is to say on the male side M.

For the master device, this makes it possible to check whether another master is connected, in which case it becomes a slave.

For a slave device, this makes it possible to determine whether the chain of the bus is cut. If it is cut, this slave device may become a master device.

Detection on the male side M is implemented according to exactly the same principle as detection on the female side F, by applying a resistive pull voltage, for example to the pin 6, and a resetting voltage, for example to the socket 6, and by detecting a variation, if any, in the pull voltage.

Figure 6:
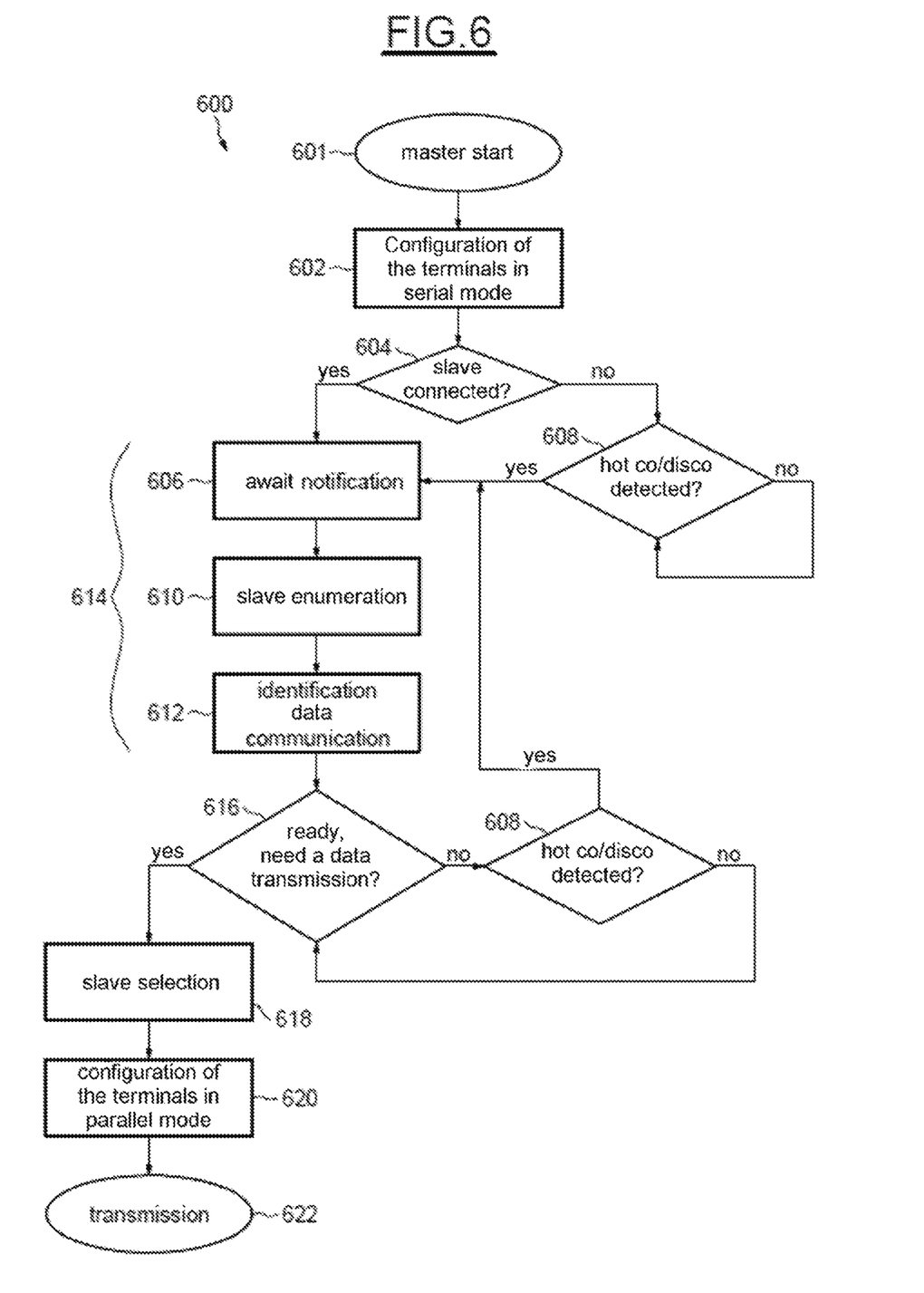

FIG. 6 represents an exemplary mode of implementation of a communication 600 on the SPI+ bus described in conjunction with FIGS. 2 to 5, on the master device side, according to an embodiment of the present invention.

At the start 601 of a communication on the SPI+ bus, for example when turning on or following a re-initialization of the master device, the master device configures itself during step 602 in the first duplex mode (serial mode). The master device can, during its configuration in serial mode 602, dispatch a first serial mode slave device configuration command on the mode selection line SS.

For example, the first serial mode slave configuration command may be communicated by a falling edge of the signal present on the mode selection line SS.

The master device detects during step 604 whether a slave device is connected to the bus, for example in the manner described previously in conjunction with FIG. 5.

In other words, an end-of-chain detection phase is implemented in the course of an initialization step (before the selection step) by the master device. This enables the master device to know whether at least one slave is connected to the SPI+ bus.

Figure 7:
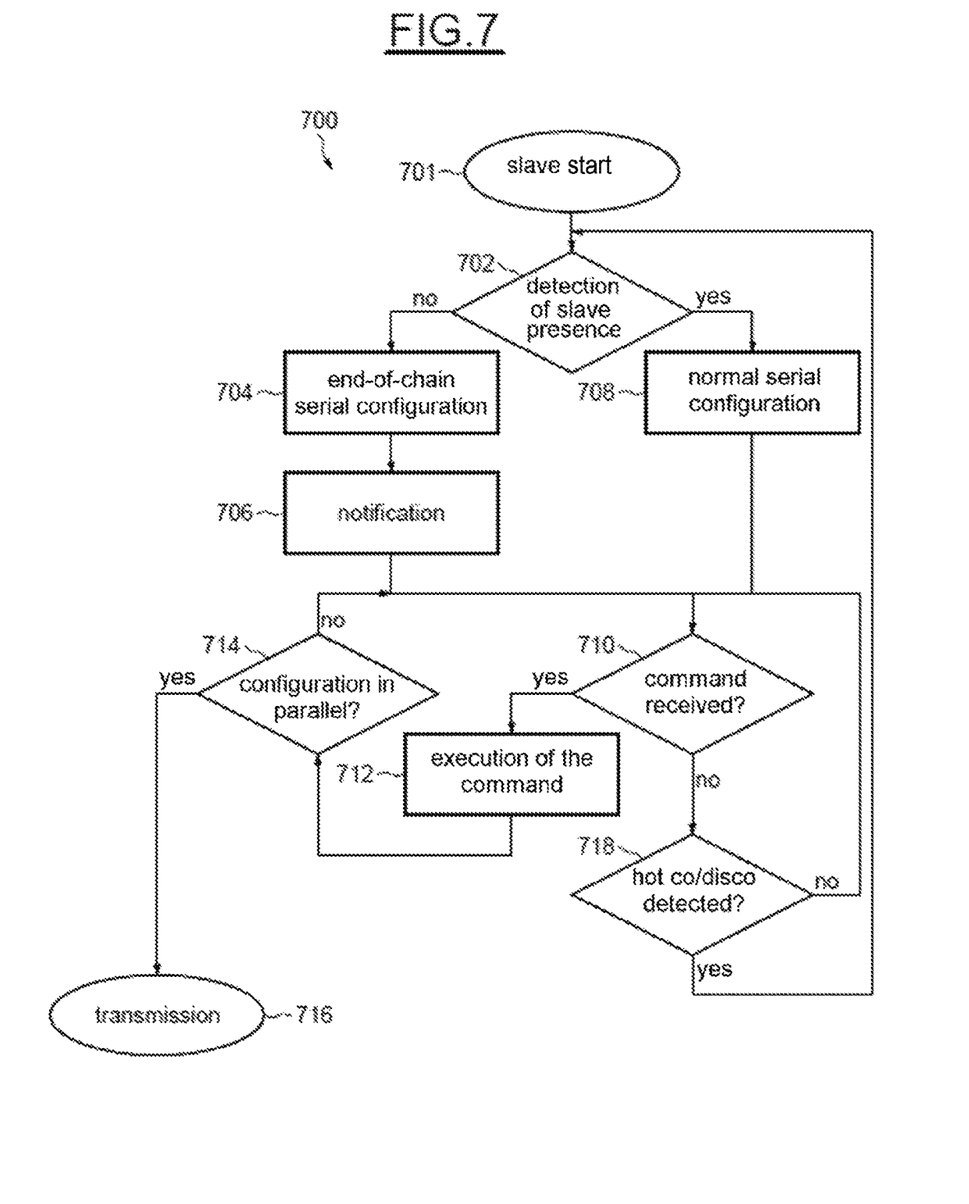

If this is the case, the master device places itself on standby awaiting slave notification during step 606 originating from the last slave device connected to the bus (e.g., as shown in step 706 of FIG. 7).

If not, the master device places itself on standby awaiting detection of hot connection during step 608. As long as a connection is not detected, the master device remains on standby awaiting detection of hot connection (step 608).

When a connection is detected, the device places itself on standby awaiting slave device notification during step 606.

It is also possible, for the sake of simplification of the method of communication on the SPI+ bus, for the phase of awaiting slave device notification (step 606) to be implemented by executing a fixed pause time, without any need for a slave notification by a slave device.

After receipt of the slave notification or elapsing of the pause time (606), the master device commences a request during step 610 for enumeration of the number of connected slave devices.

The master device must ascertain the number of slave devices in total on the bus so as to be able to address itself to all the slaves or to a slave independently.

For example, a write operation containing an echo command on a few bits is dispatched on the serial pathway as many times as necessary until the master device receives this echo. The number of dispatches of the echo command is equal to the number of slave devices connected to the SPI+ bus.

Thereafter the master device dispatches a request for communication of slave device identification data 612, still in the serial mode.

For example, the communication of identification data comprises the communication of slave characteristics such as the maximum clock signal frequency supported by each of the slave devices, the function of each of the slaves, etc.

This makes it possible to address the slave devices independently with the appropriate clock speed (in parallel mode) and to set the clock to the smallest frequency handled in the chain (in serial mode).

For example, the communication of identification data comprises a read operation dedicated to each of the enumerated slave devices (N in number), followed by N blank operations to recover the results. A positive pulse of the mode selection signal may make it possible to force the processing in each slave device.

The operations 606, 610 and 612 are included in a general phase of slave device identification 614.

Thereafter, the SPI+ bus is considered to be ready during step 616, from the point of view of the master device.

If the master device needs to implement a transmission of data with one of the slaves of the bus, it communicates during step 618 a slave selection signal on the serial pathway to the selected slave.

Otherwise, the master device places itself on standby awaiting detection of hot connection during step 608. As long as a connection is not detected, the master device test whether it needs to implement a transmission of data during step 616 and places itself back on standby awaiting detection of hot connection (step 608).

When the selection signal is transmitted to the selected device, the master device configures itself in parallel mode and dispatches a slave device selection command in parallel mode on the mode selection line SS. For example the slave selection command can be coded on a single bit.

Thereafter the transmission of data during step 622 in the parallel pathway of the bus is implemented in a manner which is optimized in relation to the slave characteristics of the selected slave device, in particular the maximum clock signal frequency supported by the selected slave device.

FIG. 7 represents an exemplary mode of implementation of a communication 700 on the SPI+ bus described in conjunction with FIGS. 2 to 5, on the slave device side, according to an embodiment of the present invention.

At the start 701 of a communication on the SPI+ bus, for example during an initialization phase such as when turning on or reinitializing the slave device, the slave device configures itself automatically in the first duplex mode (serial mode).

The slave device then detects during step 702 whether a neighbor slave device is connected to the bus, for example in the manner described previously in conjunction with FIG. 5.

If this is the case, the slave device configures itself during step 708 in "normal" serial mode, the serial input-output line MISOs of this slave device being connected to the serial output-input line MOSIs of the following slave device. Thereafter the normal slave device places itself on standby awaiting reception of command during step 710.

If not, the slave device configures itself during step 704 in "end-of-chain" serial mode, the serial input-output line of this slave device being connected to the parallel output-input line MOSIp of the master device.

The last slave device then notifies the master device of its presence during step 706, confirming the looping of the selection channel of the SPI+ bus.

Thereafter, the slave device places itself on standby awaiting reception of command during step 710.

When a command originating from the master device is received, the slave device executes it during step 712. The command may be for example a request for communication of slave device identification data (step 612), the transmission of an echo command, or a slave selection.

If the slave has received a slave selection and if a second parallel mode slave configuration command is received during step 714 on the mode selection line, then the slave device configures itself in parallel mode and implements a transmission of data according to the orders of the master device.

For example, the second parallel mode slave configuration command may be communicated by a rising edge of the signal present on the mode selection line SS.

Otherwise (step 714), the slave device places itself on standby awaiting reception of command during step 710.

If no command is communicated, the slave device places itself on standby awaiting detection of hot connection during step 718.

If a connection is not detected, the slave device places itself on standby awaiting detection of hot connection/disconnection (e.g., as shown in step 608 of FIG. 6).

If a connection is not detected, the device places itself on standby awaiting reception of command (step 710), and so on and so forth until a command is received or until a slave device is hot connected/disconnected.

If hot connection/disconnection is detected, the device recommences the end-of-chain slave device detection step 702 and the following steps.

Thus, the end-of-chain detection phase is implemented in the course of an initialization step (that is to say before the selection step) and in the course of the transmission steps, by each of the slave devices.

In some embodiments, the single master/multiple slave SPI+ bus comprises only six wires whatever the number of slaves. The SPI+ bus makes it possible to dynamically change between parallel and series topologies so as to obtain the best performance in the communication stream, but also having some flexibility with a complementary functionality of hot plugging/unplugging during execution.

The slaves may for example have simple functions of button, battery, sensor, motor, modem, fingerprint reader, GPS, display, radiofrequency transmission stage, which, being linked to the bus, form a more complex and tailorable system.

Moreover, the invention is not limited to these embodiments but embraces all variants thereof, for example, although embodiments and modes of implementation suitable for duplex ("full-duplex") communication have been described, the invention is nonetheless compatible with half-duplex communication. Furthermore, the six-pin connectors described previously in conjunction with FIG. 5 have been given by way of example, as have the points on which the detections of neighbor devices are implemented.

What is claimed is:

1. A method of communication between a master device and N slave devices on a synchronous data bus, the method comprising: selecting, by the master device, a slave device from among the N slave devices during a selection step using a selection channel, wherein the master device and the N slave devices are coupled in series through the selection channel; and transmitting data between the master device and the selected slave device during a transmission step using a transmission channel, wherein the master device and the N slave devices are coupled in parallel through the transmission channel; and wherein the synchronous data bus comprises a mode selection line, and wherein the selecting further comprises: generating, by the master device, a first slave configuration command to place the N slave devices in a serial mode; transmitting, by the master device, the first slave configuration command using the mode selection line; and transmitting, by the master device, a slave identification data request to the N slave devices.

2. The method of claim 1, wherein the selecting further comprises: generating, by the master device, a second slave configuration command to place the selected slave device in a parallel mode; and transmitting, by the master device, the second slave configuration command using the mode selection line.

3. The method of claim 1, further comprising transmitting, by each slave device of the N slave devices, respective slave identification data, wherein the respective slave identification data comprises respective slave device characteristics comprising a respective maximum clock signal frequency supported by each of the N slave devices.

4. The method of claim 1, further comprising: transmitting, by each slave device of the N slave devices, respective slave identification data; and enumerating slave devices coupled to the synchronous data bus based on the respective slave identification data.

5. The method of claim 1, further comprising:
detecting, by each of the N slave devices, a presence signal on the selection channel during an end-of-chain detection step, wherein the master device and the N slave devices form a chain; and
determining an end-of-chain position based on detecting during the end-of-chain detection step, wherein the end-of-chain detection step is performed before the selection step.

6. The method of claim 5, wherein the detecting further comprises:
applying, by each of the N slave devices, a pull voltage to a respective first terminal of a respective slave device of the N slave devices, the respective first terminal coupled on a first side of the selection channel;
applying, by each of the N slave devices, a resetting voltage to a respective second terminal of the respective slave device, the respective second terminal coupled on a second side of the selection channel; and
determining a presence of a slave device based on a variation of the pull voltage.

7. The method of claim 5, further comprising detecting hot connection or disconnection of a slave device to or from the synchronous data bus by periodically performing the end-of-chain detection step.

8. The method of claim 1, wherein transmitting data between the master device and the selected slave device is in accordance to a serial peripheral interface bus (SPI) protocol type.

9. A system comprising: a master device; and N slave devices coupled to a synchronous data bus, the synchronous data bus comprising a selection channel and a transmission channel, the master device and the N slave devices being coupled in series to the selection channel and coupled in parallel to the transmission channel, wherein the master device and the N slave devices are configured to: exchange slave selection data on the selection channel to select from among the N slave devices a selected slave device, and transmit data between the master device and the selected slave device on the transmission channel; and wherein the synchronous data bus comprises a mode selection line, wherein the master device is configured to generate on the mode selection line a first slave configuration command configured to place the N slave devices in a serial mode before exchanging slave selection data, wherein exchanging slave selection data exchanging slave selection data in serial mode, and wherein the slave selection data comprise a communication of slave identification data by the N slave devices and a communication of a slave selection command by the master device.

10. The system of claim 9, wherein the N slave devices are configured to communicate slave identification data comprising slave characteristics comprising a maximum clock signal frequency supported by each of the N slave deices.

11. The system of claim 9, wherein the master device and the N slave deices are configured to communicate identification data comprising an enumeration of a number of slave devices coupled to the synchronous data bus.

12. The system of claim 9, wherein the master device is configured to generate on the mode selection line a second slave configuration command configured to place the selected slave device in a parallel mode, and wherein transmitting data between the master device and the selected slave device comprises transmitting data between the master device and the selected slave device in parallel mode.

13. The system of claim 9, wherein the N slave devices and the master device form a chain and each of the N slave devices is configured to detect a respective end-of-chain position by performing a detection of a presence signal on the selection channel representative of the respective end-of-chain position during transmission of data and before exchanging the slave selection data, and wherein the master device is configured to detect an end-of-chain position by performing a detection of a presence signal on the selection channel before exchanging selection data.

14. The system of claim 13, wherein each of the N slave devices is configured, at a moment of the detection of a presence signal on the selection channel, to apply a pull voltage to a first terminal coupled on a first side of the selection channel and a resetting voltage to a second terminal coupled on a second side of the selection channel, and wherein a variation of the pull voltage at the first terminal is representative of a presence of a neighbor slave device.

15. The system of claim 13, wherein the master device and the N slave devices are configured to detect an end-of-chain position periodically to detect hot connection or disconnection of a slave device to or from the synchronous data bus.

16. The system of claim 9, wherein the synchronous data bus comprises a clock line, and wherein the master device is configured to generate a clock signal on the clock line to regulate exchanges and transmissions of data between the N slave devices coupled to the synchronous data bus.

17. The system of claim 9, wherein the master device and the N slave devices are configured to generate commands, communications and transmissions of data in accordance to a serial peripheral interface bus (SPI) protocol type.

18. The system of claim 9, wherein the selection channel comprises a first master-output-slave-input (MOSI) line and a first master-input-slave-output (MISO) line, linking one-by-one in a chain the master device and the N slave devices, and wherein the transmission channel comprises a second MOSI line and a second MISO line, linking in parallel the N slave devices with the master device.

19. The system of claim 18, wherein the master device and the N slave devices comprise:
a first bus interface of the serial peripheral interface bus (SPI) type comprising a clock line terminal, a MOSI terminal and a MISO terminal; and
a second bus interface comprising:
a first MOSI terminal,
a first MISO terminal,
a second MOSI terminal,
a second MISO terminal,
an output-input switch linking the MOSI terminal to one or the other of the first and second MOSI terminals, and
an input-output switch linking the MISO terminal to one or the other of the first and second MISO terminals.

20. A system comprising:
a master device and N slave devices, wherein the master device comprises:
a master bus interface of the serial peripheral interface bus (SPI) type, the master bus interface comprising:
a clock terminal coupled to a clock line,
a master master-output-slave-input (MOSI) node,
a master master-input-slave-output (MISO) terminal coupled in parallel to the N slave devices, and
a master mode selection terminal coupled in parallel to the N slave devices;
a first master MOSI terminal coupled to a first slave device of the N slave devices;
a second master MOSI terminal coupled in parallel to the N slave devices; and
an master output-input switch coupled between the master MOSI node and the first and second master MOSI terminals, wherein the master output-input switch is configured to link the master MOSI node to one or the other of the first and second master MOSI terminals, and wherein each of the N slave devices comprises:
a slave bus interface of the SPI type, the slave bus interface comprising:
a clock terminal coupled to the clock line,
a slave MOSI node,
a slave MISO node, and
a slave mode selection terminal coupled to the master mode selection terminal;
a first slave MOSI terminal;
a second slave MOSI terminal coupled to the second master MOSI terminal;
a slave output-input switch coupled between the slave MOSI node and the first and second slave MOSI terminals, wherein the slave output-input switch is configured to link the slave MOSI node to one or the other of the first and second slave MOSI terminals;
a first slave MISO terminal;
a second slave MISO terminal coupled to the master MISO terminal; and
a slave input-output switch coupled between the slave MISO node and the first and second slave MISO terminals, wherein the slave input-output switch is configured to link the slave MISO node to one or the other of the first and second slave MISO terminals.

21. The system of claim 20, wherein the first slave MOSI terminal of the first slave device is coupled to the first master MOSI terminal, and wherein the first slave MISO terminal of the first slave device is coupled to a the first slave MOSI terminal of a second slave device of the N slave devices.

* * * * *

UNITED STATES PATENT AND TRADEMARK OFFICE
CERTIFICATE OF CORRECTION

PATENT NO.        : 10,552,366 B2                                    Page 1 of 1
APPLICATION NO.   : 16/027062
DATED             : February 4, 2020
INVENTOR(S)       : Thierry Biniguer It is certified that error appears in the above-identified patent and that said Letters Patent is hereby corrected as shown below:

On the Title Page

Item (71) Applicant, Line 2, delete "Delarue" and insert --Le Mans--

Signed and Sealed this
Third Day of November, 2020

Andrei Iancu
*Director of the United States Patent and Trademark Office*